United States Patent

[11] 3,594,983

[72] Inventor James D. Yearout
Rolling Hills, Calif.
[21] Appl. No. 834,011
[22] Filed June 17, 1969
[45] Patented July 27, 1971
[73] Assignee Process Services Inc.
Gardena, Calif.

[54] GAS-TREATING PROCESS AND SYSTEM
15 Claims, 2 Drawing Figs.
[52] U.S. Cl. .................................................. 55/33,
55/58, 55/62, 55/179
[51] Int. Cl. ........................................................ B01d 53/04
[50] Field of Search ............................................ 55/33, 58,
62, 75, 179

[56] References Cited
UNITED STATES PATENTS
2,850,114  9/1958  Kehde et al. .................. 55/62 X
3,078,634  2/1963  Milton ........................... 55/75 X
3,085,379  4/1963  Kiyonaga et al. .............. 55/75 X
3,176,445  4/1965  Collins et al. .................. 55/75 X Primary Examiner—John Adee
Attorney—Max Geldin ABSTRACT: Removal of certain components from gas mixtures such as hydrocarbon mixtures, particularly the removal of carbon dioxide and small quantities of other gases such as water vapor and hydrogen sulfide, from natural gas for production of natural gas of improved heating value, by an adsorption process and system, including according to one embodiment, passing natural gas containing a minor amount of carbon dioxide, and small amounts of water vapor and hydrogen sulfide, through a synthetic zeolite or molecular sieve in three separate adsorption zones to remove the carbon dioxide, hydrogen sulfide and water vapor by adsorption in such zones, recovering a purified natural gas stream, and regenerating the adsorbent in the three adsorption zones by a combination of pressure swing regeneration and thermal swing regeneration, the pressure swing regeneration occurring in relatively short periods of time of the order of about one-half hour for two of the adsorbent zones, employing a pressurized purge gas such as nitrogen, or a vacuum, so that one of the two last mentioned zones is undergoing pressure desorption for removal of the adsorbed carbon dioxide, while the other of such two zones is on stream, such one-half hour on stream—one-half hour pressure regeneration cycles being carried out for a substantial period, and concurrently therewith, the third adsorption zone, which had been previously on stream and previously subjected to such pressure swing regeneration for desorption of carbon dioxide, is subjected to thermal desorption during the period of on stream—pressure desorption cycling of the two first mentioned zones, to thereby desorb the more strongly adsorbed water vapor and hydrogen sulfide components.

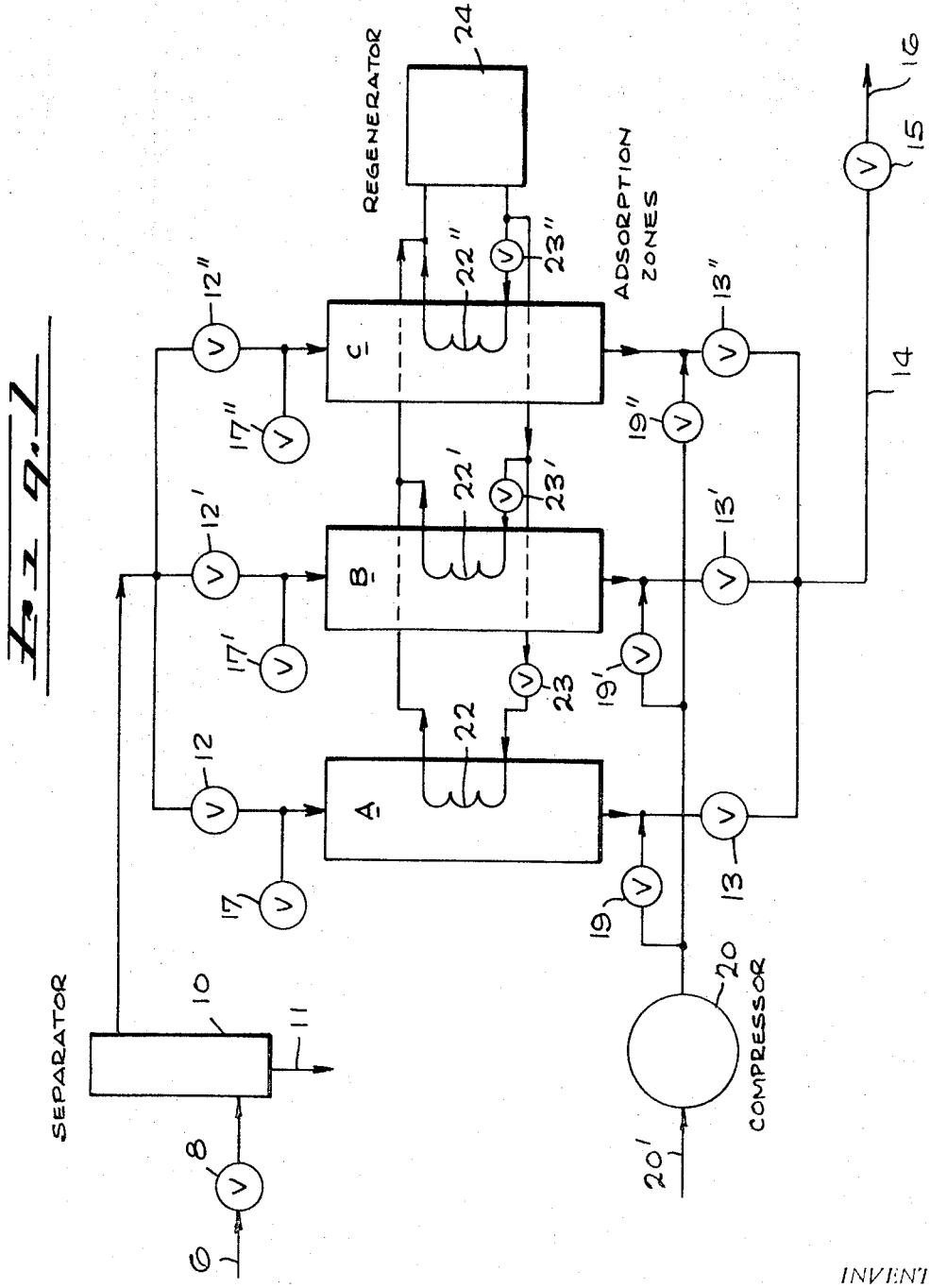

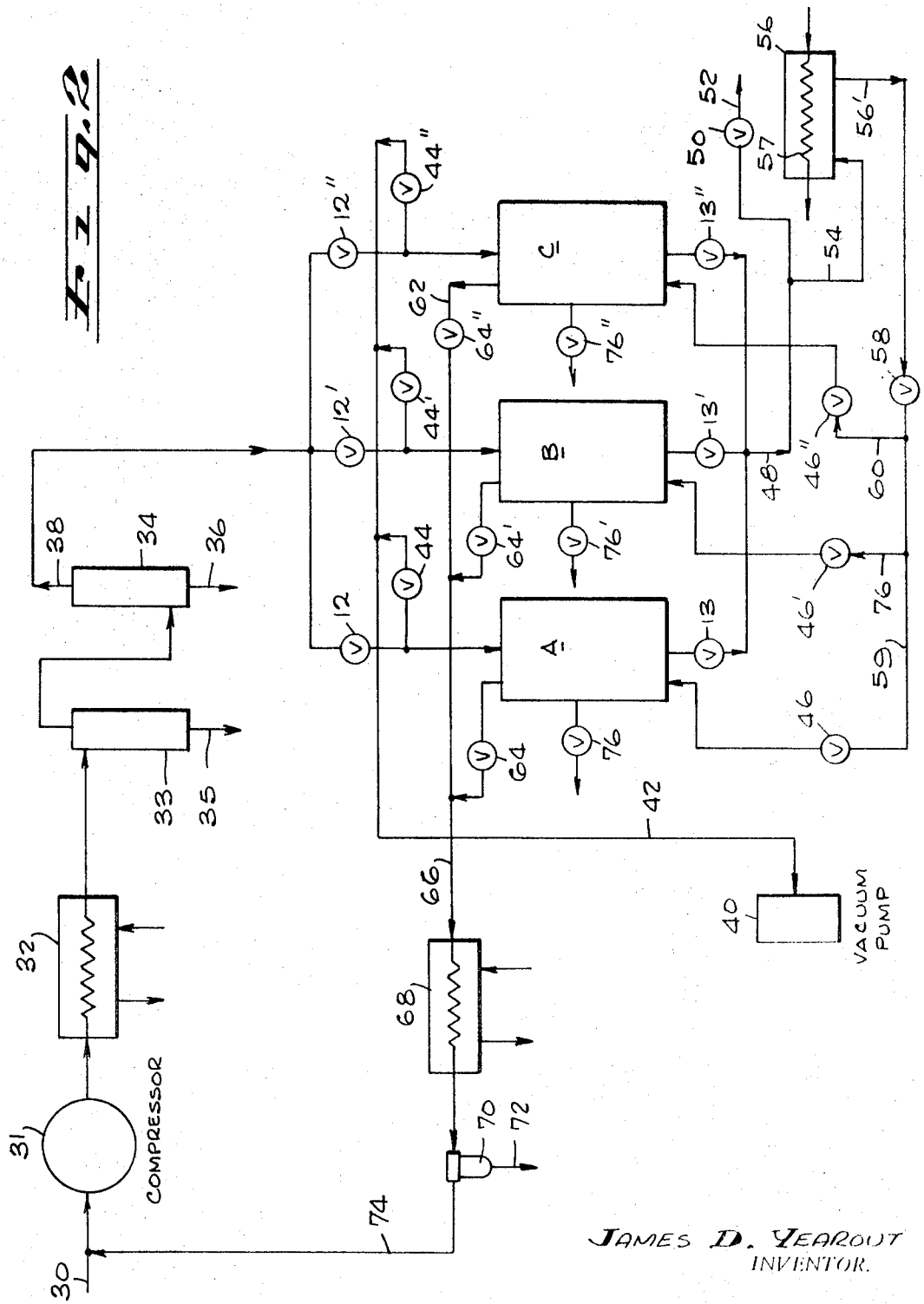

GAS-TREATING PROCESS AND SYSTEM

This invention relates to treatment of gas mixtures such as hydrocarbon gases by an adsorption process for removal of certain components, in combination with efficient desorption of the adsorbed components from the adsorption zones to afford efficient reuse and recycling of such zones, and is particularly concerned with a process and system for producing natural gas of acceptable heating value from a natural gas feed stream consisting essentially of hydrocarbon gases, a minor proportion of carbon dioxide and small quantities of other gases, particularly including water vapor and hydrogen sulfide, using at least three zones for adsorption or removal of such carbon dioxide, water vapor and hydrogen sulfide, and employing a combination of regeneration features for removing and desorbing the adsorbed carbon dioxide, water vapor and hydrogen sulfide, to provide highly efficient regeneration of the adsorption zones for further treatment and purification of the natural gas feed stream.

It is known that certain natural zeolites, including analcite and chabazite, have the property of preferentially adsorbing certain types of hydrocarbons from mixtures thereof with other hydrocarbons, thus enabling the separation, for example, of normal paraffinic hydrocarbons from branch chain paraffinic hydrocarbons and/or cyclic and aromatic hydrocarbons.

It is also known that zeolites of the above nature function as selective adsorbents for removal of carbon dioxide, water vapor and hydrogen sulfide, and other impurities, from hydrocarbon mixtures, e.g. natural gas, as described in the brochure "Linde Molecular Sieves" Union Carbide Company, and the particular zeolites which can be employed for this purpose are described in this brochure.

Zeolites differ from each other in chemical composition but they may be generally characterized as alkali metal or alkaline earth metal hydrated alumino-silicates.

The crystal patterns of these zeolites are such that they present structures containing a large number of pores having an exceptional uniformity of size. Only molecules that are small enough to enter the pores can be adsorbed. The pores in different zeolites may vary in diameter from less than 4 to 15 or more Angstrom units, but for any one zeolite the pores are substantially of uniform size. Because of these properties, such zeolites are known as molecular sieves. The 4 A and 13 X molecular sieves described in the above Linde brochure are effective for adsorption or removal of the above noted contaminants carbon dioxide, water vapor and hydrogen sulfide from hydrocarbon mixtures.

After a period of use of such molecular sieve adsorbents as in the adsorption of carbon dioxide, water vapor and hydrogen sulfide from a natural gas, the molecular sieve adsorbent must be regenerated by desorption of the adsorbed components, which can be accomplished by various means such as by passage of an inert gas through the spent adsorbent, by lowering the pressure of the adsorbent zone (pulling a vacuum on the adsorbent) and/or by increasing the temperature of such zone.

When employing a natural gas feed containing carbon dioxide, water vapor and hydrogen sulfide, an passing such natural gas feed through a zeolitic molecular sieve adsorbent of a selected pore size such as the 4 A molecular sieve noted above, all three undesirable components or contaminants of the natural gas feed are coadsorbed, with the adsorption bond strength decreasing in the order: water vapor, hydrogen sulfide, carbon dioxide. Since the adsorption bond strength of carbon dioxide is the lowest of the above noted three components, 2 will be the major contaminant in the natural gas effluent stream from the adsorber, and the $CO_2$ concentration in the effluent is controlled by the adsorbent regeneration cycle.

Adsorbed carbon dioxide in the spent zeolitic molecular sieve adsorbent following a period of treatment of a natural gas feed containing carbon dioxide as well as the water vapor and hydrogen sulfide, can be removed from the adsorbent by desorption employing, e.g., a compressed inert gas, or by subjecting the adsorbent to a vacuum, as noted above. Such pressure desorption of carbon dioxide and regeneration of the zeolitic adsorbent takes place relatively rapidly. On the other hand, removal of the more strongly adsorbed hydrogen sulfide and water vapor from the spent zeolitic adsorbent after a period of on-stream treatment of the above noted contaminated natural gas feed, requires relatively high-temperature thermal desorption at temperatures of the order of about 400° to about 650° F to desorb such hydrogen sulfide and water vapor, and such thermal regeneration requires a substantially longer period of time and greater energy expenditure than the above noted pressure regeneration for removal or desorption of carbon dioxide adsorbed on the zeolitic adsorbent.

Hence, in a system for treatment of hydrocarbon mixtures such as natural gas, to remove certain components thereof, such as the above noted carbon dioxide, water vapor, hydrogen sulfide, an heavy hydrocarbons, employing suitable adsorbents for such contaminants, particularly zeolitic molecular sieve adsorbents, in order to carry out such adsorption procedure at a minimum capital cost and operating at a minimum regeneration energy and with minimum feed stock losses, an adsorption process an system for this purpose having a unique combination of pressure and thermal adsorption regeneration cycles is required.

Such unique combination of pressure and thermal regeneration cycles is provided according to the present invention.

The invention broadly comprises a process and system for the separation of at least two components from a gas mixture such as an essentially hydrocarbon mixture, wherein the mixture is contacted with an adsorbent to adsorb such components and the adsorbed components of the mixture are periodically desorbed from the adsorbent in a cyclic manner, the improvement comprising contacting the gas mixture with an adsorbent in at least three adsorption zones, including alternately passing the gas mixture through at least two of such adsorption zones, such two adsorption zones being subjected alternately to pressure swing regeneration in a plurality of cycles, wherein during each of such cycles a first adsorption zone of such two last mentioned adsorption zones in on stream for passage of the gas mixture therethrough to adsorb certain of said components of the gas mixture, while a second adsorption zone of such two last mentioned adsorption zones is subjected to pressure desorption for desorbing at least one of such components adsorbed thereon. During the entire period of on stream-pressure desorption cycling of the two first mentioned adsorption zones, a third adsorption zone which had been previously on stream for passage of the gas mixture therethrough and also previously subjected to the above noted pressure swing regeneration for desorbing at least one of the adsorbed components of the gas mixture noted above, is subjected to thermal desorption, to thereby desorb at least a second adsorbed component of the gas mixture not previously desorbed during such previous pressure desorption, from the third adsorption zone.

The process and system of the present invention are particularly designed so that each of the above noted two first mentioned adsorption zones has an adsorption capacity in relation to the period of the pressure desorption during each of the above noted pressure swing regeneration cycles, such that when the adsorption zone which is on stream is substantially spent, the other of the two above noted adsorption zones is substantially desorbed with respect to the one or more adsorbed components removed by pressure desorption. Also, each of the two adsorption zones being subjected to pressure swing regeneration has an adsorption capacity for one or more of the other adsorbed components not removed during pressure swing regeneration, in relation to the period of the thermal desorption in the third adsorption zone, such that when one of the two first mentioned zones is spent with respect to substantially complete adsorption of such other more strongly adsorbed components not removed during pressure desorption, such third adsorption zone is substantially thermally desorbed.

As previously noted, the process and system of the present invention are particularly designed for the adsorptive sweetening of a hydrocarbon gas mixture, particularly a natural gas utilizing a zeolitic molecular sieve adsorbent. In the system of the invention according to preferred practice, a natural feed gas comprising essentially hydrocarbons, particularly methane, together with small amounts of other hydrocarbons such as ethane, propane, n-butane and isobutane, and which can include small amounts of heavy hydrocarbons such as hexanes and octanes, and including a minor amount of carbon dioxide, e.g., ranging from about 5 percent to about 40 percent, by volume, water vapor, e.g., up to saturation, and a small amount, up to about 1 percent by volume, e.g. from about 0.0005 percent to about 1 percent, by volume, of hydrogen sulfide, is passed through three or more adsorption zones or reactors, which are operated in a swing reactor pattern according to the present invention so that at least one adsorption zone is always on stream while two others of the adsorption zones are undergoing pressure desorption or regeneration, and thermal desorption or regeneration, respectively.

Thus, in the practice of the invention employing a natural gas feed as noted above, two different desorption or regeneration cycles are carried out for each adsorption zone or reactor, wherein each reactor is maintained alternately on stream and alternately subjected to a pressure swing or pressure desorption regeneration purge, for one pair of adsorption zones or reactors, e.g., utilizing nitrogen or other inert gas purge to desorb carbon dioxide, followed by an off stream period wherein the adsorption zone or reactor previously subjected to such on stream and pressure desorption cycles, is thermally regenerated, as by passage of a hot heat exchange fluid through the adsorbent bed, to remove adsorbed hydrogen sulfide and water. At least three reactors are required for the operation of the invention process, two being alternately on stream and subjected to pressure desorption, while the third adsorption zone is completely off stream for thermal regeneration.

Following thermal regeneration or thermal desorption of the third adsorption zone, one of the two first mentioned adsorption zones which is spent or expended with respect to substantially complete adsorption of water vapor and hydrogen sulfide, is replaced with the third thermally regenerated adsorption zone or reactor, while such expended adsorption zone is subjected to thermal regeneration, and the combination of pressure and thermal regeneration cycles is repeated.

Since the pressure swing regeneration cycles for purging carbon dioxide from the zeolitic molecular sieve adsorbent is relatively rapid an can be carried out on short cycles of the order of only about one-half hour, whereas the thermal regeneration cycle is a much longer cycle and may require for example about 8 hours for completion, by utilizing the above described combination of pressure and thermal regeneration cycles, the greatest efficiency is realized. Thus, at least one of the adsorption zones or units is always in operation or on stream, while at least two of such adsorption zones are concurrently being subjected to the above pressure and thermal regeneration cycles with only one of the adsorption zones being thermally regenerated on the long thermal cycle.

This mode of operation according to the invention minimizes the amount of adsorbent, e.g. zeolitic molecular sieve, required for processing a unit amount of the natural gas feed, while at the same time increasing the efficiency of the system with respect to the amount of heat required for thermal regeneration. —p The invention will be more clearly understood by reference to the description below of certain preferred embodiments of the invention, taken in connection with the accompanying drawings wherein:

FIG. 1 is a schematic illustration of a system for carrying out the invention process; and FIG. 2 is a schematic illustration of a system embodying a modification of the invention process.

Referring to FIG. 1 of the drawing, a natural gas feed, indicated at 6 in the drawing, at a pressure of 150 p.s.i.a. and 80° F. and having the following composition, is provided:

|                   | % by Volume           |
|-------------------|-----------------------|
| $H_2O$            | Saturated             |
| Nitrogen          | 0.08                  |
| Oxygen            | 0.02                  |
| Carbon Dioxide    | 20.32                 |
| Methane           | 63.19                 |
| Ethane            | 5.47                  |
| Propane           | 4.30                  |
| Isobutane         | 1.34                  |
| N-Butane          | 2.17                  |
| Isopentane        | 1.04                  |
| N-Pentane         | 0.37                  |
| Hexanes           | 1.70                  |
| Hydrogen Sulfide  | 11 parts per million  |

Following passage of the feed gas 6 through a valve 8, the natural gas feed is first passed through a phase separator 10 for removal of entrained liquid at 11 and the resulting gas feed containing carbon dioxide, water vapor and hydrogen sulfide, is passed through the two adsorption units A and B containing zeolite 4A molecular sieve adsorbent for adsorbing the three last mentioned contaminants. The exiting processed or purified natural gas substantially free of water and hydrogen sulfide, and containing only about 0.2 percent carbon dioxide, is recovered at 14 passed through valve 15, and delivered as product at reduced pressure, e.g., 20 to 75 p.s.i.a., at 16.

In carrying out the invention, adsorbers A and B are alternately placed on stream for passage of the natural gas feed stream through the adsorbers respectively, adsorber A being placed initially on stream for a period of about one-half hour by opening inlet valve 12 while the inlet valve 12' to adsorber B is maintained closed.

Also, during this period of on stream operation of adsorber A, vent valve 17 and purge gas valve 19 are maintained closed while product outlet valve 13 is maintained open.

During on stream operation of adsorber A, the second adsorber B is being subjected to pressure regeneration or pressure desorption by passage of dry nitrogen or dry natural gas, provided at 20' and compressed at 20 to a pressure just sufficient to compensate for the system pressure drop, e.g. a pressure ranging between about 20 and about 30 p.s.i.a., through the adsorber B by opening valve 19' and vent valve 17', the effluent compressed purge gas being blown or discharged at 16 through the vent valve 17', thus unloading the zeolitic molecular sieve in adsorber B of the adsorbed carbon dioxide adsorbed on the zeolite as a result of the previous on stream operation of the adsorber B.

The on stream adsorber A has a capacity in relation to the period required for desorption or purging of the adsorbed carbon dioxide in adsorber B, such that when adsorber A is spent or expended, adsorber B is completely purged of carbon dioxide. Such period for pressure desorption of carbon dioxide in adsorber B can take place in a short time of about one-half hour. Following purging of carbon dioxide from adsorber B, adsorber B can then be placed on stream while adsorber A is being subjected to pressure desorption as described above, both for a period of one-half hour, by closing valves 12, 13, 17' and 19' and opening valves 12', 13', 17 and 19.

Each of the adsorbes A and B also requires thermal regeneration in the above described process, following 16 hours of on stream-pressure regeneration cycling as described above. In order to provide greatest efficiency according to the invention, a third adsorber C is also provided in the system. Thus, during the on stream-pressure regeneration cycling of adsorbers A and B, adsorber C, which had been previously on stream for processing the natural gas feed and subjected to pressure desorption as in the case of adsorbers A and B, is subjected to an 8 hour period of thermal regeneration for removal of adsorbed water vapor, hydrogen sulfide and heavy hydrocarbons such as hexanes in the feed gas, not removed by pressure regeneration. Such thermal regeneration is accomplished by passage of a suitable heat exchange fluid such as the commercially available Dowtherm, through coil 22″ of the zeolitic molecular sieve 4 A adsorbent in zone C, the heat exchange fluid being at a temperature of about 600° F for this purpose. Such heat exchange fluid is cycled through a regeneration boiler 24 to maintain the temperature of the circulating fluid. During this period of thermal regeneration of adsorber C, valves 12″, 13″ and 19″ are closed, and valve 23″ is open for passage of the Dowtherm through coil 22″, and vent valve 17″ is open for purging of adsorbed water vapor, hydrogen sulfide and heavy hydrocarbons from the adsorbent in the adsorber C. Dowtherm inlet valves 23 and 23′ to adsorbers A and B are maintained closed during this period.

Following the 8 hour period of thermal regeneration of the zeolitic molecular sieve in adsorber C, adsorber C is placed in operation for processing feed gas together with adsorber A, for a total on stream period of 8 hours as described above, including alternate one-half hour pressure regeneration periods for a total of 8 hours, during this period of on stream operation, while adsorber B is placed on thermal regeneration for a period of 8 hours as noted above by passage of Dowtherm via valve 23′ through coil 22′ of adsorber B; following which units B and C are then employed for processing the gas, with pressure regeneration during such period, while adsorber A is placed on the thermal regeneration cycle for a period of 8 hours by passage of Dowtherm via valve 23 through coil 22 of adsorber A.

Accordingly, it is seen from the above that each of the absorbers A, B and C is on stream for a total period of 8 hours and undergoing pressure desorption for a total period of 8 hours, the total on stream-pressure desorption cycles being carried out for 16 hours, and the thermal regeneration is carried out for a total period of about 8 hours, the thermal regeneration in one of the adsorbers taking place during the on stream-pressure desorption in the other two adsorbers. Thus, it is seen that two of the adsorption units such as A and B, are always in operation alternately for processing the natural gas, while one of the adsorption units such as C is being thermally regenerated on the long 8 hour thermal cycle.

Referring now to FIG. 2 of the drawing, illustrating a modification of the process and system described above and illustrated in FIG. 1, a natural feed gas as described above and having essentially the composition noted above, indicated at 30, is compressed at 31 to 150 p.s.i.a., the compressed natural gas C is passed through aftercooler 32 to reduce the temperature of the feed to ambient, and the resulting compressed natural gas feed is fed to a pair of phase separators 33 an 34 to remove entrained liquid hydrocarbons at 35 and 36.

The natural gas effluent at 38 is then passed through adsorbers A and B in alternate one-half hour cycles, as described above with respect to FIG. 1 of the drawing, with alternate one-half hour desorption swings being carried out in the respective adsorbers B and A during the period of on-stream adsorption of the respective adsorbers A and B. Thus, during the period of passage of the natural gas feed through adsorber A for adsorption of the carbon dioxide from the feed gas, adsorber B is undergoing desorption of carbon dioxide from the zeolitic molecular sieve adsorbent employed in both of the adsorbers A and B. In this embodiment, instead of employing an inert gas such as dry nitrogen or dry natural gas for pressure desorption of the carbon dioxide from adsorbers A and B, a vacuum pump 40 is connected via line 42 and valve 44 or 44′, to adsorbers A and B respectively, valve 44 being closed during on stream processing of the natural gas in adsorber A, and valve 44′ being open for desorption of carbon dioxide from the zeolitic adsorbent in adsorber B. Thus, by means of a vacuum, the carbon dioxide in adsorber B is unloaded from the adsorbent, the capacity of the adsorbent in adsorber A being such that the adsorbent is essentially spent or expended, at the time that adsorber B is essentially desorbed of carbon dioxide, both occurring in a period of one-half hour.

It will be noted that in the system of FIG. 1, pressure swing regeneration or desorption of zones A and B was carried out by employing a compressed purge gas such as dry nitrogen, whereas in FIG. 2 the adsorption zones A and B are unloaded of carbon dioxide by subjecting the adsorbers A and B to reduced pressure. In both cases the partial pressure of the adsorbed carbon dioxide is reduced to effect desorption thereof. Hence, the term "pressure regeneration" or the term "pressure desorption" as employed herein denotes either of the above modes of desorbing carbon dioxide from the zeolitic adsorbent beds, including the use of a compressed purge gas such as nitrogen, or use of reduced pressure (a vacuum), the net effect of either mode being to reduce the partial pressure of the adsorbed material, e.g. carbon dioxide, in the gas phase above the adsorbent.

It is noted that effluent natural gas product produced from on-stream operation of adsorbers A and B, respectively, are passed via valves 13 and 13′ to line 48, and after passage through pressure reducing valve 50 is collected as product at reduced pressure, e.g. 60 p.s.i.a., at 52, the product natural gas retaining only of the order of about 0.2 percent carbon dioxide, and being substantially free of water vapor, hydrogen sulfide, and heavy hydrocarbons, including hexane.

During an 8 hour period of on-stream and pressure desorption taking place in adsorbers A and B, the third adsorber C, also containing a zeolitic molecular sieve as in the case of adsorbers A and B, and which was previously subjected to on-stream and pressure desorption for removal of adsorbed carbon dioxide, is subjected to a thermal regeneration. For this purpose, valves 12″, 44″ and 13″ associated with adsorber C are closed, and valve 46″ is open.

A minor portion, e.g. about 5 to about 10 percent, of the compressed effluent natural gas output in line 48 is bypassed at 54, through a heater 56 in indirect heat exchange relation with a heat exchange fluid at 57, such as Dowtherm heat exchange fluid, and the heated dry natural gas at 56′ at a temperature of about 600 ° F and which is essentially free of hydrogen sulfide and water vapor, after passage through the open valve 58, is passed through line 60 and open valve 46″ into the adsorber C, desorbing the zeolitic adsorbent in zone C of water, hydrogen sulfide and hexane, during passage of such natural gas through the adsorbent. The effluent natural gas from adsorber C, together with the desorbed water vapor and hydrogen sulfide is passed through line 62 from the top of adsorber C, via open valve 64″, through line 66, and aftercooler 68, and through a trap 70 for removal of water from the natural gas stream at 72, and the resulting natural gas stream at 74 is then combined with incoming natural gas feed at 30 to be processed in the system as described above.

During the period of on stream-pressure desorption cycling of adsorbers A and B, and thermal desorption in adsorber C in FIG. 2 above, valves 46 and 64 of adsorber A, and valves 46′ and 64′ of adsorber B, are closed. Vent valves 76, 76′ and 76″ of adsorbers A, B and C respectively, are maintained closed.

Following an 8 hour period of thermal regeneration in adsorber C, at which time the zeolitic molecular sieve adsorbent therein is now desorbed of water vapor, hydrogen sulfide and heavy hydrocarbons (hexanes), adsorber C can then replace adsorber B, employing adsorbers A and C for on stream-pressure desorption cycling for a period of 8 hours, while adsorber B is subjected to thermal regeneration for a period of 8 hours. For this purpose, valves 12″, 13″ and 44″ associated with adsorber C are open, and valves 46″ and 64″ are closed, while the corresponding valves 12′, 13′ and 44′ associated with adsorber B are closed, and valves 46′ and 64′ thereof are open to permit passage of the hot bypassed dry natural gas product stream in lines 56 and 76, through adsorber B for thermal desorption.

Following thermal regeneration of adsorber B, it is then placed in on stream-pressure desorption cycling together with adsorber C, both for a period of 8 hours, while adsorber A is then placed on thermal regeneration by closing valves 12, 13 and 44, and by passage of a portion of the dry natural feed gas output passing through line 59 and open valve 46 through adsorber A, with the resultant effluent natural gas and desorbed water vapor, hydrogen sulfide and heavy hydrocarbons passing through open valve 64, and being collected and processed via line 66 as previously described.

It is seen from the description above in connection with FIGS. 1 and 2, that thermal regeneration in the adsorbers can be carried out by employing heating coils in the adsorbers as at 22 in FIG. 1, or by means of a thermal regeneration gas which may include any gas suitable as a purge gas such as dry nitrogen, dry natural gas, and the like, as illustrated in FIG. 2.

It will be understood that the process and system of the invention can be employed to remove any polar material from a hydrocarbon mixture or natural gas stream, including sulfur dioxide as well as hydrogen sulfide. Where sulfur dioxide is present in the feed gas and is adsorbed on the adsorbent, e.g. zeolitic molecular sieve, since the adsorption bond strength of sulfur dioxide is about the same as that of carbon dioxide, both sulfur dioxide and carbon dioxide can be desorbed and essentially removed in the pressure regeneration or pressure desorption cycles, whereas the more strongly adsorbed water and hydrogen sulfide require removal in the thermal regeneration swing as noted above.

Where hydrogen sulfide is present in large quantities in a hydrocarbon mixture or natural gas, and an adsorbent in the form for example of a zeolitic molecular sieve adsorbent is available which permits removal or desorption of hydrogen sulfide in the pressure swing regeneration, only adsorbed water present in the feed gas will require removal in the thermal regeneration cycle.

It will be understood also that the process and system of the invention are applicable for treatment of hydrocarbon mixtures or natural gas to remove contaminants other than carbon dioxide, water vapor, hydrogen sulfide, sulfur dioxide and heavy hydrocarbons. For example, the process of the invention can be employed for adsorbing mercaptans, alcohols, acetylenic compounds, etc., often found as contaminants in hydrocarbon mixtures.

It will also be understood that the principles of the invention are applicable basically to the adsorption of two or more components of any gas, wherein one or more of such components have a substantially higher adsorption bond strength than other components of the gas, so that a combination of both pressure regeneration and thermal regeneration is required and can be carried out according to the invention. Thus, for example, the invention process and system can be employed for (a) separating CO and $CO_2$ from the products of combustion, (b) $SO_2$ and $H_2S$ removal from chemical process waste gas, or for air pollution control, (c) purification of fluorocarbons by removal of $CO_2$, $H_2O$ and HCl contaminants (d) removal of $CO_2$ and $H_2O$ vapor from steam reformer gas containing CO, and (e) removal of $SO_2$ and $H_2S$ both present in minor proportion from a gas containing a major proportion of $CO_2$. In the latter case, for example, adsorbed $SO_2$ is removed by pressure regeneration and adsorbed $H_2S$ by thermal regeneration.

Depending upon the particular feed gas employed and the adsorbed components, although the process of the invention has been described chiefly in relation to the use of zeolitic molecular sieve adsorbents, other adsorbents can be employed such as silica gel, activated charcoal, and the like. Thus, for example, activated charcoal can be used as adsorbent in process (e) noted above.

It will be further understood that pressure desorption as described above can be carried out at any suitable pressure or any suitable vacuum, and that the thermal regeneration can be carried out at any suitable temperature for efficient desorption or removal of contaminants such as water and hydrogen sulfide. For such pressure or thermal desorption any suitable gaseous stripping medium can be employed, including in addition to dry nitrogen and natural gas noted above, methane, hydrogen, carbon dioxide, carbon monoxide and flue gas. Where such gases are employed for thermal regeneration, they are heated to a suitable temperature as noted above, e.g. in the process illustrated in FIG. 2 above.

While I have described particular embodiments of my invention for purposes of illustration, it will be understood that variations and modifications of the invention will occur to those skilled in the art, and the invention is not to be taken as limited except by the score of the appended claims.

I claim:

1. In a process for the separation of at least two components from a gas mixture, wherein said mixture is contacted with an adsorbent to adsorb said components and adsorbed components of said mixture are periodically desorbed from said adsorbent in a cyclic manner, the improvement which comprises contacting said gas mixture with an adsorbent in at least three adsorption zones, including alternately passing said gas mixture through at least two of said adsorption zones, said at least two adsortpion zones being subjected alternately to pressure swing regeneration in a plurality of cycles, wherein during each of such cycles a first adsorption zone of said two last mentioned adsorption zones is on stream for passage of said gas mixture therethrough to adsorb certain of said components of said gas mixture, while a second adsorption zone of said at least two last mentioned adsorption zones is subjected to pressure desorption for desorbing at least one of said components adsorbed therein, and wherein a third adsorption zone which had been previously on stream for passage of said gas mixture therethrough and also previously subjected to said pressure swing regeneration for desorbing said at least one of said adsorbed components of said gas mixture is subjected to thermal desorption during the entire period of on stream-pressure desorption cycling of said at least two first mentioned adsorption zones, to thereby desorb at least a second adsorbed component of said gas mixture not previously desorbed during said previous pressure desorption from said third adsorption zone, each of said at last two first mentioned adsorption zones having an adsorption capacity in relation to the period of said pressure desorption during each said pressure swing regeneration cycles such that when the adsorption zone which is on stream is substantially spent, the other of said adsorption zones is substantially desorbed with respect to said at least one of said adsorbed components, and each of said two first mentioned adsorption zones having an adsorption capacity for said at least second adsorbed component in relation to the period of said thermal desorption in said third adsorption zone, such that when one of said two first mentioned zones is spent with respect to substantially complete adsorption of said at least second adsorbed component, said third zone is substantially thermally desorbed.

2. A process as defined in claim 1, wherein said gas mixture is an essentially hydrocarbon mixture.

3. A process as defined in claim 1, wherein said third adsorption zone following said thermal desorption, is placed on stream alternately with said first of said two first mentioned adsorption zones, and said third and said first adsorption zones alternately subjected to said pressure swing regeneration, and wherein said second of said two first mentioned adsorption zones is subjected to said thermal desorption.

4. A process as defined in claim 1, wherein said gas mixture is an alternately hydrocarbon mixture, and wherein said third adsorption zone following said thermal desorption, is placed on stream altenately with said first of said two first mentioned adsorption zones, and said third and said first adsorption zones alternately subjected to said pressure swing regeneration, and wherein said second of said two first mentioned adsorption zones is subjected to said thermal desorption.

5. A process as defined in claim 4, including three adsorption zones, said adsorbent employed in each of said adsorption zones being a zeolitic molecular sieve adsorbent of a selected pore size for adsorbing said components of said hydrocarbon mixture desired to be adsorbed.

6. A process as defined in claim 5, wherein said pressure desorption during pressure swing regeneration in each of said two first mentioned adsorption zones is carried out by passage of a compressed purge gas alternately through each of said two first mentioned zones.

7. A process as defined in claim 5, wherein said thermal desorption in said third adsorption zone is carried out by heating said third adsorption zone.

8. A process as defined in claim 5, wherein said pressure desorption during pressure swing regeneration in each of said first mentioned adsorption zones is carried out by passage of a compressed purge gas alternately through each of said two first mentioned zones, or by subjecting each of said two first mentioned zones alternately to a vacuum, and wherein said thermal desorption in said third adsorption zone is carried out by heating said third adsorption zone.

9. A process as defined in claim 5, wherein said gas mixture contains a minor portion of carbon dioxide, water vapor and a small amount of hydrogen sulfide, said carbon dioxide, water vapor and hydrogen sulfide being adsorbed by said zeolitic molecular sieve adsorbent in each of said adsorption zones, said carbon dioxide being desorbed from said zeolitic adsorbent in said two first mentioned adsorption zones during the pressure swing regeneration cycles therein, and said water vapor and hydrogen sulfide being desorbed from said zeolitic adsorbent in said third adsorption zone during said thermal desorption in said third adsorption zone, said pressure swing regeneration cycles for desorption of carbon dioxide being relatively rapid, and said thermal regeneration for desorption of said water vapor and hydrogen sulfide being a substantially longer cycle than each of said pressure swing regeneration cycles.

10. A process as defined in claim 9, wherein said desorption of carbon dioxide from said zeolitic adsorbent in said two first mentioned adsorption zones is carried out by passage therethrough of a compressed purge gas selected from the group consisting of compressed dry nitrogen and natural gas, and said thermal regeneration in said third zone is carried out by indirect heating of the zeolitic adsorbent in said zone.

11. A process as defined in claim 10, wherein each of said two first mentioned adsorption zones is subjected to a plurality of on-stream and pressure desorption cycles, the first adsorption zone being on stream for about one-half hour while the second adsorption zone is subjected to pressure desorption for one-half hour, each for a total period of 16 hours, and said thermal regeneration in said third adsorption zone is carried out for a period of about 8 hours.

12. A process as defined in claim 5, wherein said pressure desorption during pressure swing regeneration in each of said two first mentioned adsorption zones is carried out by subjecting each of said two first mentioned zones alternately to a vacuum.

13. A process as defined in claim 5, wherein said thermal desorption in said third adsorption zone is carried out by passage of a hot gas through said third adsorption zone.

14. A process as defined in claim 5, wherein said pressure desorption during pressure swing regeneration in each of said first mentioned adsorption zones is carried out by subjecting each of said two first mentioned zones alternately to a vacuum, and wherein said thermal desorption in said third adsorption zone is carried out by passage of a hot gas through said third adsorption zone.

15. A process as defined in claim 9, wherein said desorption of carbon dioxide from said zeolitic adsorbent in said two first mentioned adsorption zones is carried out by subjecting said adsorbent to reduced pressure, and said thermal regeneration in said third zone is carried out by passage of a minor portion of heated effluent hydrocarbon mixture product essentially free of hydrogen sulfide and water vapor from said process, through said third adsorption zone.